United States Patent

[11] 3,619,723

| | | |
|---|---|---|
| [72] | Inventor | John P. Walden<br>Schenectady, N.Y. |
| [21] | Appl. No. | 76,828 |
| [22] | Filed | Sept. 30, 1970 |
| [45] | Patented | Nov. 9, 1971 |
| [73] | Assignee | General Electric Company |

[54] SENSITIVE PEAK CURRENT DETECTOR FOR GROUND FAULT PROTECTION CIRCUITS
12 Claims, 3 Drawing Figs.

[52] U.S. Cl.................................................. 317/18 R,
317/22, 317/33 SC, 317/38, 317/49
[51] Int. Cl...................................................... H01h 47/18,
H02h 1/04
[50] Field of Search............................................ 317/38, 36
TD, 49, 33 SC, 22, 18 R, 141 S; 328/151

[56] References Cited
UNITED STATES PATENTS
3,544,846  12/1970  Thompson..................... 317/33 SC
3,555,358   1/1971  Gibbs.......................... 317/38 X

*Primary Examiner*—James D. Trammell
*Attorneys*—John F. Ahern, Paul A. Frank, Frank L. Neuhauser, Oscar B. Waddell, Joseph B. Forman, Julius J. Zaskalicky and Donald R. Campbell ABSTRACT: A full- or half-wave peak current detector of a few milliamperes of power circuit fault current includes, for each polarity, a normally conducting first transistor continuously supplied with base current. In response to sensing an instantaneous above-threshold fault current, the base current is diverted through a mirror-image connected second transistor, turning off the first transistor for so long as the above-threshold current exists. For full-wave detection the role of the transistors is reversed on the other polarity. This actuates one or more series RC filter networks to delay the output indication and reduce the detector sensitivity to high-frequency transients or noise. The valid power frequency output signal opens a circuit interrupter.

3,619,723

Inventor:
John P. Walden,
by Donald R. Campbell
His Attorney.

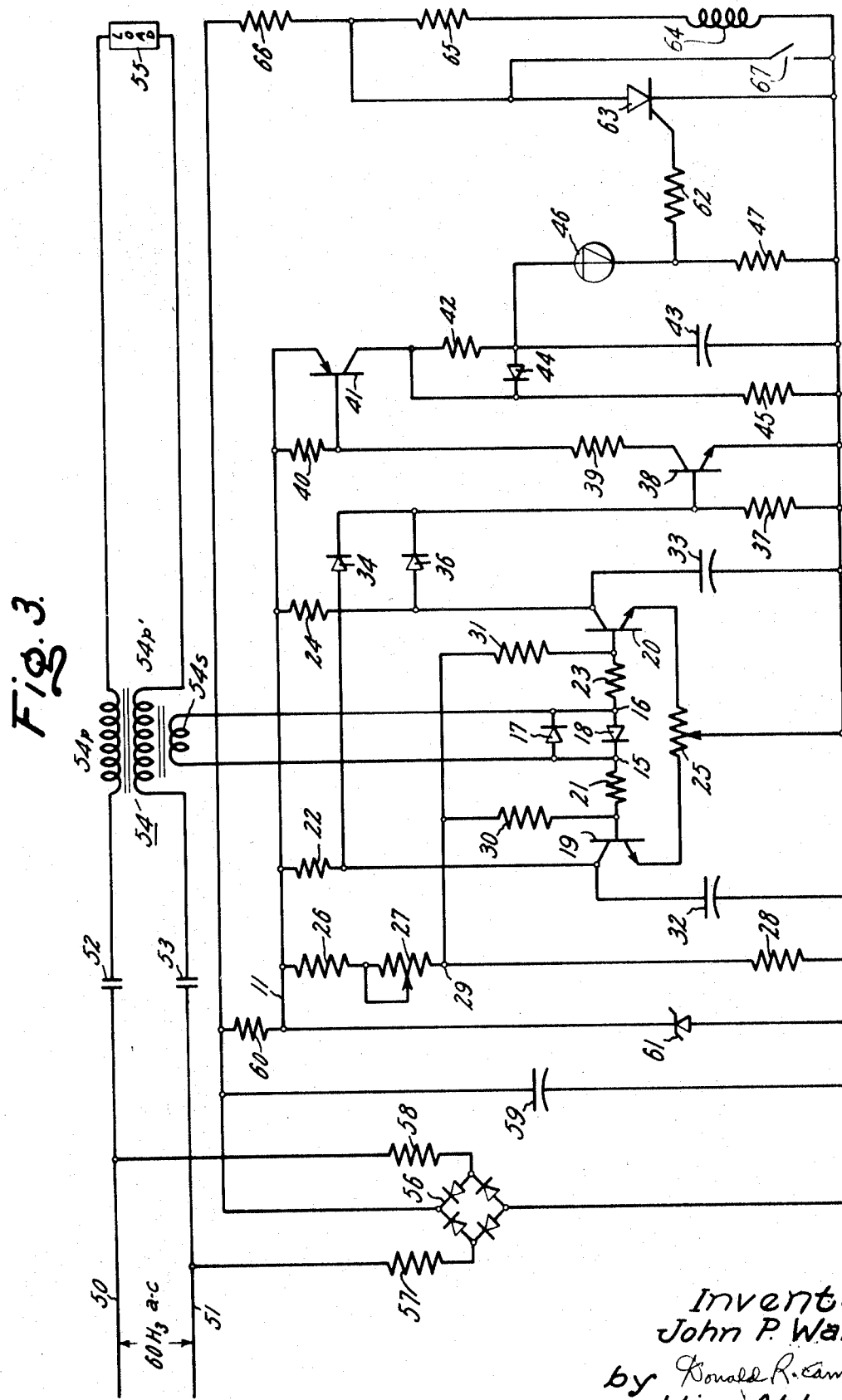

SENSITIVE PEAK CURRENT DETECTOR FOR GROUND FAULT PROTECTION CIRCUITS

This invention relates to an electronic peak current detector especially suitable for use in ground fault protection circuits, and more particularly to a fast acting, sensitive peak current detector and ground fault protection circuit that rejects high frequency transients and is actuated reliably when the fault current exceeds a selected instantaneous magnitude.

Ground fault protection systems prevent injury to the user of electrical equipment upon misuse or failure of the equipment which causes the user to be subject to electrical shock or to the possible passage of current through his body to ground. The protection system commonly operates to disconnect the equipment from the voltage source within a short enough interval after the detection of the ground fault current or leakage current to prevent serious human injury, and further damage to the equipment, by reason of the rise of the fault current above the let-go and lethal levels and by its continuation for an excessive period of time. A conservative estimate of the magnitude of permissible fault current, well below the let-go or freezing level for the average person, is one to five milliamperes. Fault currents of this small magnitude, if detected and used to initiate prompt interruption of the power circuit, should cause little harm to the user.

A difficulty with the early but valid recognition of a few milliamperes of fault current is the existence in power circuits of high-frequency transients that may rise instantaneously above this current level. This is especially true in the home, an apartment building, or a commercial establishment, where ground fault protection is most needed, because of the electrical "noise" typical of the circuits connected to common household appliances and office equipment. The peak currents of these usually harmless high-frequency oscillations and pulses exceed the threshold of a fault current-detecting circuit, and unless accounted for may cause spurious tripping of the protection system. The fault current detector must distinguish and account for high-frequency transients, yet reject them while retaining the capability of quickly recognizing true power frequency ground fault currents greater than the detector threshold. Although a variety of fault current detectors and ground fault protection circuits are known, improvements can be made in such circuits as suggested by the following objects.

An object of the invention is to provide a highly sensitive, fast acting solid-state peak current detector suitable for generating a reliable output indication with minimum delay when the instantaneous magnitude of fault current rises above a preselected safe value.

Another object is the provision of a full wave or half wave ground fault current detector, using normally conducting transistors as the principal components, that is capable of sensing a few milliamperes of peak current and features reduced sensitivity to high-frequency power circuit transients.

Yet another object is an improved ground fault protection circuit incorporating a sensitive peak current detector of the foregoing type that offers a high degree of protection to people against electrical shock and injury.

In accordance with the invention, a sensitive peak current detector in a ground fault protection circuit includes, for half wave detection, a transistor that is continuously supplied with base current by a bias circuit to maintain the transistor normally conducting. The sensing of instantaneous currents above the threshold by a power circuit fault current sensor, typically a differential current transformer connected in the power circuit being protected, causes current-diverting means to divert sufficient base current from the transistor to turn it off. Preferably the current diverting means is another transistor. In a full wave current detector, which is the preferred embodiment, the fault current sensor is effectively connected between the base electrodes of a pair of mirror-image transistors so that on one polarity of the fault current the base current in one transistor decreases while the base current of the other transistor increases, and vice versa for the other polarity of fault current. To filter out instantaneous above-threshold high-frequency transients that could result in a false output indication, one or more series RC filter networks are actuated in response to the turning off of a transistor. A valid low power frequency output indication is produced after the time delay required to charge a capacitor in the main filter network to a predetermined voltage. Preferably a voltage sensitive switch is rendered conductive to gate a thyristor that actuates a power circuit interrupter to open.

The foregoing and other objects, features, and advantages of the invention will be apparent from the following more particular description of several preferred embodiments of the invention, as illustrated in the accompanying drawings wherein:

FIG. 3 is a detailed schematic circuit diagram of the preferred embodiment of the invention, a ground fault circuit interrupter incorporating the sensitive peak current detector of FIG. 1.

Figure 1:
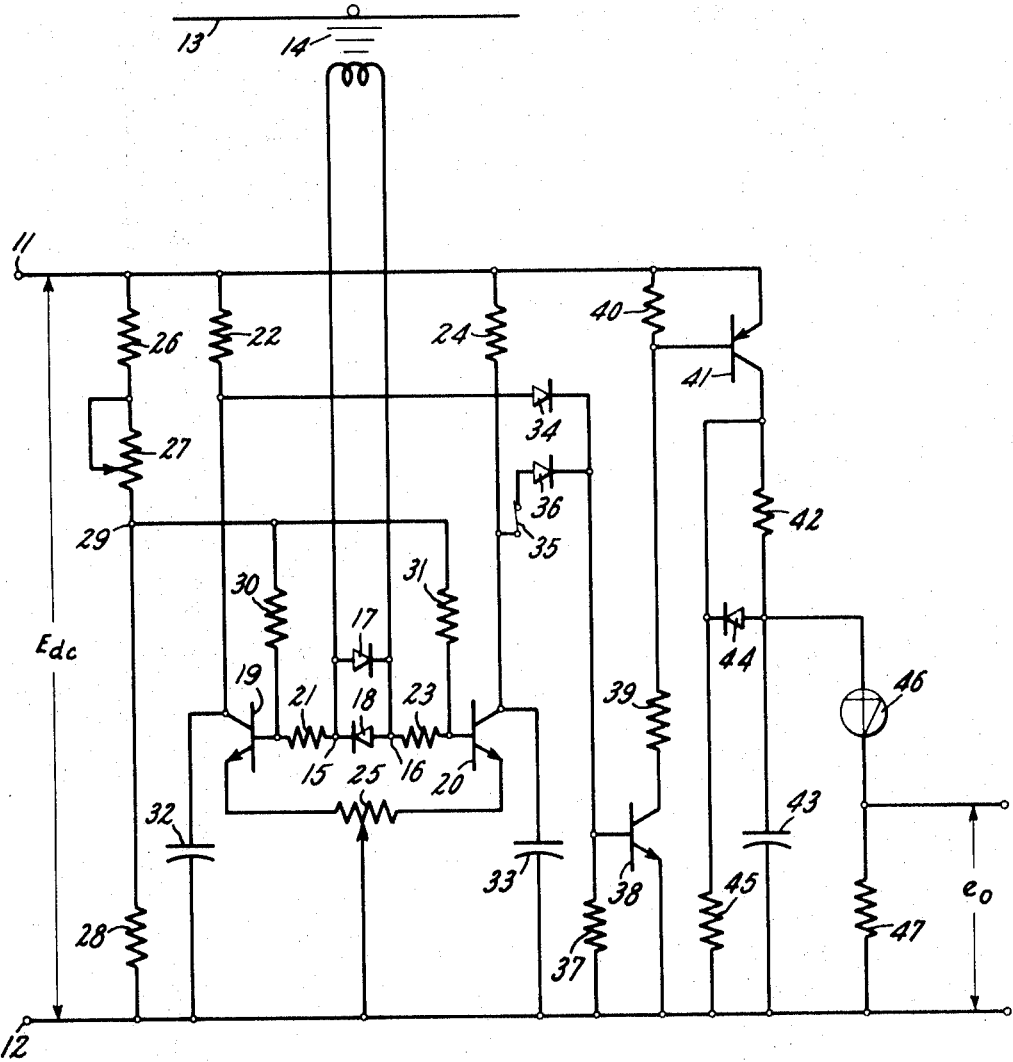
FIG. 1 is a schematic circuit diagram of a peak ground fault current detector constructed in accordance with the invention for full wave detection, and including a switch that is opened for half wave detection.

The peak current detector shown in FIG. 1 is capable of detecting small ground fault currents in the range of about 1 to 5 milliamperes, depending on the circuit adjustment. The detector circuit per se is supplied with low magnitude unidirectional voltage $E_{dc}$, for example 13 volts, from a suitable DC source connected between input terminals 11 and 12. For the purposes of explanation, it is assumed that the ground fault current to be measured flows in a wire 13. Wire 13 connected in appropriate manner to a power circuit energized by a commercially available 60 Hz. source of voltage, although the circuit principles apply to other low power frequencies in the range of 25 to 400 Hz. In addition to valid low-power frequency ground fault currents, there may also be flowing in wire 13 a variety of high-frequency current pluses or oscillations whose instantaneous magnitude exceeds the detector threshold sensitivity of 1 high-frequency 5 milliamperes. As was previously mentioned, these high-frequency transients are not true indications of a power circuit ground fault and therefore must be rejected by the current detector circuitry to prevent generating a false output indication.

The currents flowing in wire 13, both the valid potentially dangerous fault currents and high-frequency transients, are sensed and supplied to the detector input circuit by a current transformer 14, or by some other suitable fault current sensor such as a field resistor, which operates on the basis of the magnetoresistive effect, or a magnetic sensitive diode, which changes forward bias characteristics when the magnetic field applied to it is changed. Current transistor 14 senses the currents in wire 13 and also transforms these currents to the magnitude required by the detector input circuit. Since the current detector circuit preferably operated at a very low current levels in the microampere range to minimize transformer exciting current requirements, current transformer 14 has a conventional current stepdown turns ratio. The secondary winding of transformer 14 is connected between the detector circuit input terminals 15 and 16, and a pair of back-to-back diodes 17 and 18 are also preferably connected between the input circuit terminals 15 and 16 to prevent damage to the detector circuit in the event current transformer 14 is subjected to high level primary current. These protective diodes are forward biased, on opposite half cycles, only when the voltage between the ends of the secondary winding of current transformer 14 exceeds approximately 0.7 volts. Under normal operating conditions the secondary voltage is nearly a magnitude or more less than this.

In the peak current detector, the above-threshold current sensing devices are a pair of mirror-image transistors 19 and 20. On opposite half cycles, transistors 19 and 20 sense all currents applied to input circuit terminals 15 and 16 that have an instantaneous magnitude in excess of the detector threshold. Both transistors are normally in the conducting state, and change to the nonconducting state to indicate the presence in wire 13 of a fault current or high-frequency transient in excess of the threshold level. The provision of normally conducting transistors that turn off, rather than normally nonconducting transistors that turn on to give a fault current indication, improves the sensitivity of the detector. As illustrated, devices 19 and 20 are NPN transistors, but can also be PNP devices provided appropriate circuit modifications are made. The two transistors are preferably identical devices to obtain the required sensitivity. The base of transistor 19 is connected to input circuit terminal 15 through a resistor 21, and the collector is connected through a resistor 22 to the positive low voltage DC supply terminal 11. In like manner, the base of transistor 20 is connected to the other input circuit terminal 16 by resistor 23, and the collector is connected by a resistor 24 to supply terminal 11. The emitters of transistors 19 and 20 are connected to opposite ends of a potentiometer 25, the movable pointer of which is connected directly to negative low voltage DC supply terminal 12. This arrangement is employed to balance the above-threshold current-sensing transistors to that full wave detection occurs very close to the same current magnitude for either transformer current polarity.

In order to bias the transistors 19 and 20 to the normally conducting state, an adjustable source of bias voltage is provided by a voltage divider comprising resistors 26, 27, and 28 connected in series between DC supply terminals 11 and 12. Resistor 27 is a variable resistor or a potentiometer for fine threshold adjustment purposes. Point 29 on the voltage divider is connected by a resistor 30 to the base electrode of transistor 19 and by resistor 31 to the base electrode of transistor 20. By adjusting variable resistor 27, the base current supplied to the base electrodes of transistors 19 and 20, which is sufficient to render the devices conducting, is adjusted to vary the threshold or trip level of current detector.

The current supplied to the base electrode of transistor 19 has two components, the normal base current flow supplied through the bias network including resistor 30, and the current supplied by current transformer 14 which flows through isolation resistor 21. Since the current in the bias network branch is always sufficient to render the device conducting, the polarity and magnitude of the current flowing through isolation resistor 21 determines whether transistor 19 remains conducting or is to be rendered nonconductive. Similarly, the bias network current flow through resistor 31 is always sufficient to turn on the other transistor 20 and it is the polarity and magnitude of the current from current transformer 14 flowing through isolation resistor 23 to the base electrode that determines whether transistor 30 remains conducting or is to be rendered nonconductive. When there is no current flow in wire 13 both transistors 19 and 20 are in their normally conducting condition. Let it be assumed that there is current flow in wire 13 with the polarity such that there is conventional positive current flow from input terminal 15 through isolation resistor 21 to the base of transistor 19, and corresponding current comprising base current diverted from the base of transistor 20 and flowing through isolation resistor 23 to the other input circuit terminal 16. The increased base drive current supplied to transistor 19 only turns this transistor on harder, whereas there is current robbing or diversion from the base of transistor 20, tending to turn off transistor 20. When the current in wire 13 exceeds the threshold level, depending on the circuit adjustment, there is sufficient decrease in base drive current for transistor 20 to render it nonconductive. For the other polarity of current flow in wire 13, such that there is decrease in base drive current for transistor 19 and an increase in base drive current for transistor 20, the reverse operation occurs in that transistor 19 is turned off while transistor 20 is turned on harder.

To filter out high-frequency transients above 100 kHz. or so, and prevent actuation of the remainder of the detector circuitry in response to these very high-frequency noise disturbances, small capacitors 32 and 33 are connected between the respective collector electrodes of transistors 19 and 20 and negative DC supply terminal 12. 10 To indicate the turning off of transistor 19, there is connected to its collector electrode the anode of a blocking diode 34. In similar manner, the collector of transistor 20 is connected through a switch 35 to the anode of a second blocking diode 36, to indicate the turning off transistor 20. Switch 35 is closed for full wave detection and is open for half wave detection, as will be explained later. The cathodes of diodes 34 and 36 are connected together and returned through a resistor 37 to negative supply bus 12. The common-connected cathodes are also coupled directly to the base of an NPN transistor 38, the emitter of which is connected to negative supply bus 12. Upon the turning off of transistor 19 or 20, the potential at the anode of the respective blocking diodes 34 and 36 rises at a rate dependent upon the time constant of resistor 22 and capacitor 32, and of resistor 24 and capacitor 33. This results in filtering the very high-frequency transients, since transistor 19 or 20 becomes conductive again before the corresponding diode 34 of 36 is forward biased.

The conduction of current through diode 34 or diode 36, depending on the polarity of the current being detected in wire 13, applies a positive potential to the base of NPN transistor 38, rendering it conductive. The base current is limited in one case by resistor 22 and in the other case by resistor 24. Resistor 37 is a bias resistor used to control the base-to-emitter impedance of transistor 38 and prevent collector-to-base leakage current from turning it on.

Before producing an output indication, it is desirable to filter or reject the remaining high-frequency transients below 100 kHz. or so. To this end, the collector of transistor 38 is returned through series resistors 39 and 40 to the positive supply terminal 11, and the junction of these resistors is connected to the base of a PNP transistor 41. The emitter of transistor 41 is tied to the positive supply bus 11, and the collector is connected to a series of RC filter circuit comprising resistor 42 and capacitor 43. To effect discharge of charging capacitor 43, the anode of a blocking diode 44 is connected to one plate of charging capacitor 43. The cathode of diode 44 is tied to the collector of transistor 41, and a discharge resistor 45 is connected between the diode's cathode and the remaining plate of charging capacitor 43.

To indicate the charging of capacitor 43 to a predetermined voltage level, there is connected directly across the capacitor the series combination of a voltage sensitive semiconductor switch 46 and a resistor 47. Voltage sensitive semiconductor switch 46 is preferably a silicon unilateral switch, but can be some other appropriate device such as a Shockley diode, a Zener diode, a unijunction transistor, a complementary unijunction transistor, or a programmable unijunction transistor. All such devices have the common characteristic that they are switched from the nonconducting to the conducting state at a predetermined voltage level. The silicon unilateral switch (SUS) is a silicon planar, monolithic integrated circuit having the electrical characteristics of a unilateral thyristor with very stable breakover voltage characteristics. The device is designed to switch from a very high to a very low impedance state when the voltage applied across the anode and cathode electrodes exceeds a predetermined threshold signal level voltage, and a gate lead provided to eliminate rate effect and to obtain triggering at lower voltages is not used for this application. The SUS is further described on page 80 of the Silicon Controlled Rectifier Manual, 4th Edition, published by the General Electric Company, copyright 1967, and available from the Semiconductor Products Department, Electronics Park, Syracuse, New York. In operation, the turning on of transistor 41 supplies current to capacitor 43 through charging resistor 42, and when the breakover voltage of SUS 46 is reached, the device is switched abruptly to the conducting state. The voltage $e_o$ generated across resistor 47 is the output indication. The sensing of high-frequency transient currents above the detector threshold, however, results in rendering transistor 41 nonconductive, as a consequence of the turning on again of transistor 19 or 20 which renders transistor 38 nonconductive, before capacitor 43 charges to the breakover voltage of SUS 46. The turning off of transistor 41 forward biases blocking diode 44, permitting capacitor 43 to discharge through resistor 45.

By way of summary, there are two sources of delay in the current detector circuitry to implement reduced sensitivity to high-frequency current pluses or oscillations due to transients and other electrical noise in the power circuit being monitored. The first is the relatively short time delay provided by the series RC circuits comprising resistor 22 and capacitor 32, and resistor 24 and capacitor 33. The charging of capacitor 32 or capacitor 33, when transistor 19 or transistor 20 turns off, delays the forward 13 biasing of blocking diodes 34 and 36. The comparatively longer delay depends on the time constant of the series RC circuit including resistor 42 and capacitor 43. The sum of the two time delays to filter out high-frequency transients, however, is short as compared to the duration of a half cycle at power frequencies. For a 60 Hz. voltage in wire 13, for example, the duration of half cycle is about 8.33 milliseconds, but the high-frequency filter delay is typically no more than 1 to 2 milliseconds. All of the filter capacitors discharge rapidly after their associated transistors, having changed state to sense or indicate an above-threshold current, revert back to the original state when the high-frequency transient current passes. Capacitors 32 and 33 are quickly discharged by the turning on of associated transistor 19 or 20. By providing a low impedance path for the discharge of capacitor 43 through diode 44 and resistor 45, there is also fast discharge of this portion of the filter network. The circuit is thus reset rapidly for the sensing of the next occurring above-threshold current. The rapid discharge of capacitor 43 further prevents a series of short noise pulses from eventually charging capacitor 43 to the breakover value of SUS 46 and causing a false detector output signal.

Figure 2:
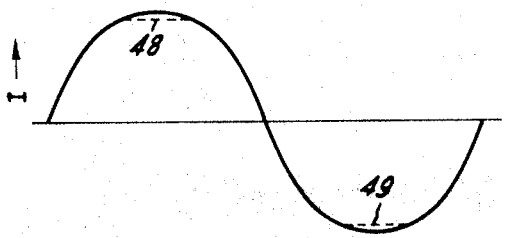
FIG. 2 is a fault current waveform showing the instantaneous peak currents that are detected by the FIG. 1 circuit.

Because of this property, and in view of the rapid response of transistors 19 and 20 to above-threshold currents flowing in wire 13, the circuit is a highly sensitive and fast-acting peak current detector. This is illustrated in FIG. 2 which shows a 60 Hz. current sine wave. The circuit detects the peak current in each polarity half cycle approximately in the area of the two dashed lines 48 and 49. A valid output indication of a 60 Hz. fault current is obtained since the circuit does not sense high-frequency transients of less time duration than this regardless of the magnitude of such transients. The technique of turning off a normally conducting transistor in response to sensing a fault current, in combination with the RC delay networks to obtain a valid output, is less sensitive to the action of transistors than a circuit arranged to turn on a transistor. When a transistor is turned on in response to an input signal and initiates the charging of a capacitor to a predetermined voltage, the occurrence of a transient variation in the input signal can have a substantial effect because the transient is additive to the normal signal. Thus a high-magnitude transient can cause a substantial change in the trip point of the circuit. On the other hand, when the input signal causes a transistor to turn off, and it is the nonconducting interval during which a capacitor charges, a transient during the off time can have no effect upon the rate of charge of the capacitor, which is determined only by the DC supply voltage and the values of the components.

With switch 35 closed, full wave detection of peak power frequency current is obtained. Since the current detector operates symmetrically on each half cycle, the circuit is also suitable for half wave detection. Opening switch 35 prevents the circuit from reacting to the turnoff of transistor 20, and thus the circuit operates to produce an output indication only during one half cycle of AC current flow in wire 13. In a peak current detector designed specifically for half wave detection, it is still desirable to retain the transistor 20 as a current diverting means for the base current of transistor 19, in order to obtain ambient temperature compensation for transistor 19. In this case, the following components are unnecessary and can be removed: resistor 24, capacitor 33, switch 35, and diode 36. Further, the collector of transistor 20 is connected directly to positive DC supply terminal 11. With this circuit connection transistor 20 functions like a diode. Half wave detection is suitable for many purposes and may be desirable because of the reduction of components and circuit complexity. As previously explained, the peak current detector is fast acting and produces a valid output indication within a few milliseconds after the power frequency current being monitored exceeds the threshold level. That is, a valid fault current output indication is available almost immediately after the occurrence of the fault current. Consequently, half wave detection is suitable for many applications, and the circuit can be used in conjunction with electromechanical breakers as well as with fast-acting solid-state circuit breakers. A reduction of components is also achieved by replacing NPN above-threshold current sensing transistors 19 and 20 by PNP transistors. In this case, transistor 38 is not needed since it is not necessary to invert the polarity of the signal delivered by blocking diodes 34 and 36, which can now be coupled more directly to the base of transistor 41.

The preferred embodiment of the invention shown in FIG. 3 is a ground fault circuit interrupter utilizing the full wave peak current detector of FIG. 1. Identical components in the current detector portion of the ground fault protection circuit are designated by the same numerals. A single phase power circuit is illustrated, but the protection system can also be used with polyphase circuits. Power circuit input terminals 50 and 51 are adapted to be connected to a 60 Hz. source of alternating current. The two sides of the AC line are in series with the respective circuit breaker contacts 52 and 53, and with the respective primary windings 54p and 54p' of a differential current transformer 54. The load 55 is connected between the two lines. Alternatively the ground fault circuit interrupter can be packaged as a portable device with the load 55 replaced by a receptacle into which the load is plugged. The secondary winding 54s of differential current transformer 54 normally is not energized because the currents flowing through the two primary windings 54p and 54p' oppose each other and are normally balanced. The net primary current is thus zero, and the secondary current is also zero. However, when the two primary currents become unbalanced because of a ground fault current flowing from load 55, a current proportional to the difference between the two power line currents flows in the transformer's secondary circuit. In a polyphase power circuit, the differential current transformer 54 now has three or more primary windings in which the net primary current is normally zero. A fault current is any one of the phases produces a net primary circuit current that is detected by secondary winding 54s. The ends of secondary winding 54s are, of course, connected to the detector input circuit terminals 15 and 16.

The DC power supply for the peak current detector is connected across power circuit input terminals 50 and 51 and includes a full wave diode bridge rectifier 56. Resistors 57 and 58, respectively connected between one of the input terminals of diode rectifier 56 and the power circuit terminals, have a current limiting and high transient voltage suppression function. Across the opposite output terminals of diode rectifier 56 is connected a large filter capacitor 59, and also the series combination of a resistor 60 and a Zener diode 61. The previously described detector circuit input terminals 11 and 12 are connected across the Zener diode. Filter capacitor 59 provides a source of current for the peak current detector in the event that there is a failure or malfunction of the 60 Hz. AC power source as a result of a ground fault.

The output pulse indication of the peak current detector produced across resistor 47 is coupled through a small resistor 62 to the gate-cathode circuit of a silicon controlled rectifier 63. As is well known, the silicon controlled rectifier is a solid state unidirectional conducting thyristor that is switched from the nonconducting to the conducting state by the application of a gating pulse to the gate electrode. Thereafter, however, the gate electrode loses control over the device and it latches in the low impedance conducting state. SCR 63 is connected in shunt with the series combination of a circuit breaker actuating coil 64 and a resistor 65, coil 64 being associated with the previously described breaker contacts 52 and 53. Coil 64 and resistor 65 are further connected in series with another resistor 66 across the output terminals of diode rectifier 56, and thus is energized when power is turned on to close breaker contacts 52 and 53. Upon being turned on by an output pulse indication from the peak current detector, SCR 63 conducts and shunts current from coil 64 and resistor 65, thereby opening the breaker contacts. Resistor 65 facilitates fast decay on the current in coil 64. A switch 67 connected directly across the SCR is used to commutate off SCR 63 so that the circuit breaker can be reset. In practice, a capacitor not shown would normally be connected between anode and cathode of SCR 63 to prevent dv/dt refiring of the thyristor following the opening of switch 67.

The operation of the peak current detector will be reviewed briefly. The occurrence of a ground fault current from load 55 or any portion of the AC line on the load side of differential current transformer 54 unbalances the currents flowing through the two primary windings 54p and 54p' of differential current transformer 54. Consequently, there is current flow in secondary winding 54s. There may also be transient current flow in secondary windings 54s due to high-frequency transients or other electrical noise in the power circuit. Back-to-back diodes 17 and 18 connected across the ends of the secondary winding protect the detector circuit from high level primary currents. The peak current detector is designed to detect instantaneous power frequency fault currents in the range of 1 to 5 milliamperes and to produce an output indication after a small delay to reject the high-frequency transients that may have instantaneous magnitudes that exceed the detector threshold level as determined by resistors 26-28. Variable resistor 27 provides a fine sensitivity adjustment of the threshold level. Base drive current for above-threshold current sensing transistors 19 and 20 is continuously supplied through resistor 30 and 31, and both transistors are normally in the conducting state. The detection of ground fault current by differential current transformer 54 increases the base drive current of one transistor, and decreases or diverts the base drive current of the other transistor, according to the polarity of the fault current. When the instantaneous magnitude of the current flowing in differential transformer secondary winding 54s exceeds the detector threshold, transistor 19 or transistor 20 turns off. This causes the anode voltage of blocking diode 34 or 36 to rise, and one of these diodes becomes forward biased after a small time delay to charge capacitor 32 or 33. In this way high-frequency transients of a 100 kHz. or more are rejected, since in this case the associated transistor 19 or 20 reverts back to the conducting state before diode 34 or 36 is forward biased.

Conduction of current through diode 34 or 36 applies a positive potential to the base of transistor 38, rendering it conductive, and in turn applying a turn-on potential to the base of transistor 41. Charging capacitor 43 begins to charge through resistor 42, and when charged to a predetermined voltage level exceeding the breakover voltage of silicon unilateral switch 46, device 46 conducts and supplies a current pulse to resistor 47. This is a valid output indication of a power circuit ground fault current. If, on the other hand, it is a hgih-frequency transient below about 100 kHz. that causes transistor 41 to turn on and initiate the charging of capacitor 43, transistor 19 or 20 turns off before capacitor 43 is charged to the voltage level that switches SUS 46. When transistor 19 or 20 resumes conducting, the base drive current of transistors 38 and 41 is removed, and as a consequence they turn off. The partially charged capacitor 43 now discharges through diode 44 and discharge resistor 45, resetting the high-frequency filter network. The appearance of an output pulse across resistor 47 supplies a gating signal to SCR 63, thereby rendering the SCR conductive and shunting the current from trip coil 64. The breaker contacts 52 and 53 open and remove power from the load circuit to prevent either human injury or equipment damage.

In summary, an improved ground fault protection circuit incorporating a sensitive, fast-acting electronic peak current detector offers a high degree of protection to people from electrical shock and potentially dangerous ground fault currents. The peak current detector comprises essentially, for each current polarity, a transistor normally supplied with base current to maintain it in the conducting state, and which turns off by diversion of base current in response to sensing an instantaneous power circuit current greater than the detector threshold. Either full wave or half wave detection is possible, and an important feature is the filtering of usually harmless high-frequency transients to prevent false actuation of a power circuit interrupter.

While the invention has been particularly shown and described with reference to several preferred embodiments thereof, it will be understood by those skilled in the art that the foregoing and other changes in form and details may be made therein without departing from the spirit and scope of the invention.

What I claim as new and desire to secure by Letters Patent of The United States is:

1. In a ground fault protection circuit including a power circuit fault current sensor and a current detector operatively coupled thereto that produces an output indication of above-threshold currents sensed by said fault current sensor, the improvement wherein said current detector comprises
    at least one transistor that conducts except during the intervals the instantaneous current sensed by said fault current sensor is above a predetermined threshold magnitude,
    bias circuit means for continuously supplying base current to maintain said transistor conducting,
    current-diverting means responsive to the sensing of instantaneous above-threshold currents by said fault current sensor for diverting a sufficient amount of the base current to turn off said transistor,
    filter means rendered operative by the turning off of said transistor for reducing the detector sensitivity to above-threshold high-frequency transient currents, and
    output indication means actuated by said filter means for producing a valid low-power frequency fault current indication.

2. A circuit according to claim 1 wherein said current diverting means is a second transistor.

3. A circuit according to claim 2 wherein said filter means includes a first filter circuit comprising a series connected first resistor and capacitor, and
    said output indication means includes a semiconductor switch operatively connected with said first capacitor to be rendered conductive upon the charging of said first capacitor to a predetermined voltage.

4. A circuit according to claim 3 wherein said filter means further includes a second filter circuit comprising a series connected second resistor and charging capacitor connected to an electrode of said first-mentioned transistor, and
    means including a rectifier for delaying the operation of said first filter circuit until said second capacitor charges to a predetermined voltage.

5. A circuit according to claim 1 wherein said current diverting means comprises another transistor connected in mirror-image fashion such that the base electrodes of both transistor are effectively coupled together, and wherein
    said filter means includes a series connected resistor and capacitor, and
    said output indication means is actuated by the charging of said capacitor to a predetermined voltage.

6. A ground fault protection circuit comprising a peak current detector circuit energized by a
    source of unidirectional voltage and including a first and second transistors connected in mirror-image fashion with their respective base electrodes effectively coupled together, a bias circuit for continuously supplying base current to at least said first transistor to maintain said first transistor conducting, a power circuit fault current sensor operatively coupled with said transistors to initiate the diversion of sufficient base current from said first transistor to said second transistor, in response to the sensing of an instantaneous above-threshold current of one polarity by said fault current sensor, to turn off said first transistor, a filter network rendered operative by the turning off of said first transistor for filtering above-threshold high-freuqency transient currents to prevent producing a false output indication, a detector output circuit actuated by said filter network for producing a valid low power frequency fault current indication, and a power circuit interrupter connected to be opened by the output indication from said detector output circuit.

7. A circuit according to claim 6 wherein said filter network includes a first filter circuit comprising a series connected first resistor and capacitor, and said detector output circuit comprises a voltage-sensitive semiconductor switch operatively connected to be rendered conductive by the charging of said first capacitor to a predetermined voltage.

8. A circuit according to claim 7 wherein said fault current sensor is a differential current transformer, and said detector output circuit further includes a thyristor having a gating circuit coupled to said voltage-sensitive semiconductor switch, said thyristor and power circuit interrupter being connected to open said interrupter upon the turning on of said thyristor in response to the output indication generated by current flow through said voltage-sensitive semiconductor switch.

9. A circuit according to claim 6 wherein said bias circuit also continuously supplies base current to said second transistor, and said fault current sensor is effectively connected between the respective base electrodes of said first and second electrodes so that, additionally, base current is diverted from said second transistor to said first transistor in response to the sensing of an instantaneous above-threshold current of the other polarity by said fault current sensor.

10. A circuit according to claim 9 wherein said filter network includes a first filter circuit comprising a series connected first resistor, first capacitor, and third transistor that is effectively connected to both said first and second transistors to be rendered conductive by the turning off of either of said first and second transistors, and said detector output circuit includes a voltage-sensitive semiconductor switch connected in parallel circuit relationship with said first capacitor to be rendered conductive by the charging of said first capacitor to a predetermined voltage.

11. A circuit according to claim 10 further including a fast capacitor discharge circuit connected in parallel with said first capacitor and to said third transistor to effect discharge of said first capacitor in response to the turning off said third transistor.

12. A circuit according to claim 11 wherein said filter network further includes second filter circuits including a series connected second resistor and capacitor and series connected third resistor and capacitor respectively coupled to the corresponding electrodes of said first and second transistors, and a pair of diodes respectively coupled between said third transistor and said second and third capacitors to delay the turning on of said third transistor until said second and third capacitors respectively charge to a predetermined voltage.

* * * * *